(12) United States Patent
Yang et al.

(10) Patent No.: US 8,296,876 B2
(45) Date of Patent: Oct. 30, 2012

(54) SINK ORGANIZER

(75) Inventors: Frank Yang, Rancho Palos Verdes, CA (US); Tzu-Hao Wei, Hacienda Heights, CA (US); Di-Fong Chang, Torrance, CA (US); Joseph Sandor, Santa Ana Heights, CA (US)

(73) Assignee: Simplehuman LLC, Torrance, CA (US)

( * ) Notice: Subject to any disclaimer, the term of this patent is extended or adjusted under 35 U.S.C. 154(b) by 209 days.

(21) Appl. No.: 12/592,854

(22) Filed: Dec. 2, 2009

(65) Prior Publication Data

US 2010/0176017 A1 Jul. 15, 2010

Related U.S. Application Data

(60) Provisional application No. 61/200,700, filed on Dec. 2, 2008.

(51) Int. Cl.
*A47J 47/20* (2006.01)
(52) U.S. Cl. .......................................................... 4/656
(58) Field of Classification Search .............. 4/656, 619, 4/630–631, 639–640
See application file for complete search history.

(56) References Cited

U.S. PATENT DOCUMENTS

| | | | |
|---|---|---|---|
| D324,902 S * | 3/1992 | Kohler et al. | D23/271 |
| 5,238,106 A * | 8/1993 | Nguyen et al. | 206/223 |
| 6,213,333 B1 | 4/2001 | Icard | |
| 2006/0056742 A1* | 3/2006 | Fenster | 383/38 |
| 2008/0149552 A1* | 6/2008 | Murphy | 210/251 |

FOREIGN PATENT DOCUMENTS

| | | |
|---|---|---|
| EP | 1972242 | 9/2008 |
| EP | 1972242 A2 * | 9/2008 |
| JP | 2004-194826 | 7/2004 |
| JP | 2004194826 * | 7/2004 |

OTHER PUBLICATIONS

Partial International Search Report of Counterpart PCT Application No. PCT/US2009/006357.

* cited by examiner

*Primary Examiner* — Lori Baker
(74) *Attorney, Agent, or Firm* — Liu & Liu

(57) ABSTRACT

A sink organizer includes a section defining a compartment having an extendable, collapsible and/or expandable base that provides a deeper holding section with an extended base to support a long slender shaped item, such as a long-handle brush. The expandable base has a telescopic structure, which may be in the form of an accordion-like structure having annular folding sections or other form of axially collapsible or telescopic structure (e.g., a concentric coupling of a series of nested and axially interlocking cylindrical collars of gradually reducing dimensions). Suction cups provide mounting of the sink organizer onto a sink wall. A bracket is attached to the side of the sink organizer where the suction cup mounting is also provided. The bracket has a handle, which is configured to rest against the top edge of the sink, thus providing additional support for stabilizing the sink organizer after it is attached to the sink wall by the suction cups.

21 Claims, 21 Drawing Sheets

SINK ORGANIZER

CROSS REFERENCE

This application claims priority of U.S. Provisional Patent Application No. 61/200,700, entitled "Sink Organizer," filed on Dec. 2, 2009. This application and other applications and documents referenced herein are fully incorporated by reference as if fully set forth herein.

BACKGROUND OF THE INVENTION

1. Field of the Invention

The present invention relates to kitchen organizers, and in particular organizers for use in sinks (e.g., kitchen sinks).

2. Description of Related Art

Heretofore, in a kitchen, cleaning tools such as sponges, soaps, brushes, etc. are placed around the kitchen sink for easy access (e.g., on the top edge of the sink, and counter tops around the sink). Dishes may be provided to hold sponges and soap, and brushes would be laid behind the faucet, or in drawers. After cleaning use, these items are wet, leaving unsightly water puddles from water drips collected on surfaces. For example, for cleaning tools placed on the top edge of the kitchen sink, water drips from the top edge of the kitchen sink down the side of the walls of the kitchen sink. The drippings (e.g., from a sponge or brush) are often dirty from previous use, or in the case of soap, the drippings is soapy. The drippings cause unsightly stains at the kitchen sink. Further, water is trapped at the top of the sink, which might cause mildew.

Some users have placed long cleaning tools, such as a long handle brush, in a container (e.g., a holder for silverware) on a dish rack to drain water from the cleaning tool after use. This would create conflict with cleaned items, when a filthy cleaning tool is mixed with cleaned items such as silverware. Further, the container on the dish rack is provided with a holding section that is not deep enough to securely support a long-handle tool.

Thus, there remains a need for a sink organizer that facilitates storing and organizing cleaning tools at a sink.

SUMMARY OF THE INVENTION

The present invention is directed to an organizer for use in a sink, to organize and store items, such as cleaning tools, including items with a long slender handle, such as a long-handle brush.

In one aspect of the present invention, the organizer includes a section defining a compartment having an expandable base (i.e., extendable and collapsible) that provides a deeper holding section with an extended base to support a long slender shaped item, such as a long-handle brush.

The sink organizer includes a container having walls defining an interior. In one embodiment, the interior defines one or more storage compartments or sections. At least one of the compartments is provided with an expandable or expandable base that can be extended or collapsed, such that the depth of this compartment is effectively extended to provide better support of a long slender item such as a long-handle cleaning brush, without worrying about the item would tip out of the container. The expandable base may be implemented with a telescopic structure, which may be in the form of an accordion-like structure having axially folding annular sections) or other form of axially collapsible, extendable and/or expandable structure (e.g., a concentric coupling of a series of nested and axially interlocking cylindrical collars of gradually reducing dimensions). In one embodiment, the expandable base is made of a one-piece molded flexible material, such as rubber or silicone, which includes axially expandable axially folding sections having gradually reducing diameters at axial distances away from the container. The expandable sections may be collapsed with the sections nested to present a base substantially flush with the bottom of the remaining sections of the container. When it is needed to store a long slender item such as a long-handle cleaning brush, the base of this compartment is extended downwardly by extending the expandable sections. The base may have a perforated bottom, and may in addition have perforations along the sides of the expandable sections.

To facilitate mounting of the organizer to the wall of the sink basin, one or more suction cups are provided on one exterior wall of the container of the sink organizer. One or more hooks or other attachment supports may be provided on the side of the container, to support items such as a wash towel.

In another aspect of the present invention, a bracket is attached to the side wall of the container of the sink organizer where the suction cup mounting is also provided (e.g., at the rear of the container on the side facing the sink wall). The bracket has a handle in the form of a bent extended end, which is configured to rest against the top edge of the sink, thus providing additional support for stabilizing the sink organizer after it is attached to the sink wall by the suction cups. With the bracket, the sink organizer is stabilized when items are being placed and removed from the sink organizer. The support of the bracket on the top edge of the sink also prevents the sink organizer from slipping at the suction cup mounting when wet, thus preventing sliding of the sink organizer down the sink wall.

In one embodiment, the bracket is attached to the side wall of the container of the sink organizer in a manner that allows adjustment of the height of the handle above the container. In a further embodiment, stops (e.g., fasteners or mechanical interlocks) are provided to securely retain the bracket at two or more predefined height positions to prevent from unintended sliding of the bracket with respect to the container.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

The present description is of the best presently contemplated modes of carrying out the invention. This description is made for the purpose of illustrating the general principles of the invention and should not be taken in a limiting sense. The scope of the invention is best determined by reference to the appended claims. The invention has been described herein in reference to various embodiments and drawings. It will be appreciated by those skilled in the art that variations and improvements may be accomplished in view of these teachings without deviating from the scope and spirit of the invention.

The present invention is directed to an organizer for use in a sink, to organize and store items, such as cleaning tools, including items with a long slender handle, such as a long-handle brush.

Figure 8:
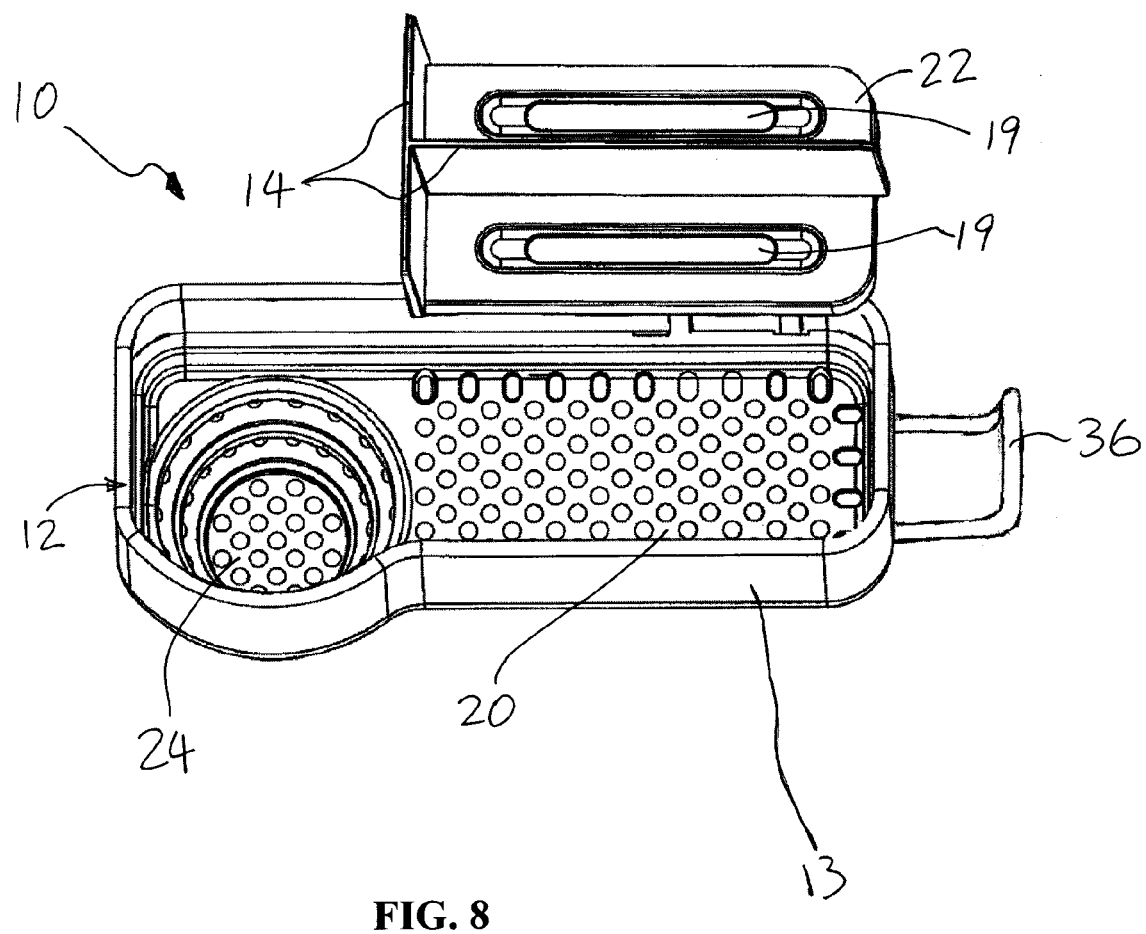
FIG. 8 is a perspective pictorial view of the sink organizer with the base extended.
Figure 9:
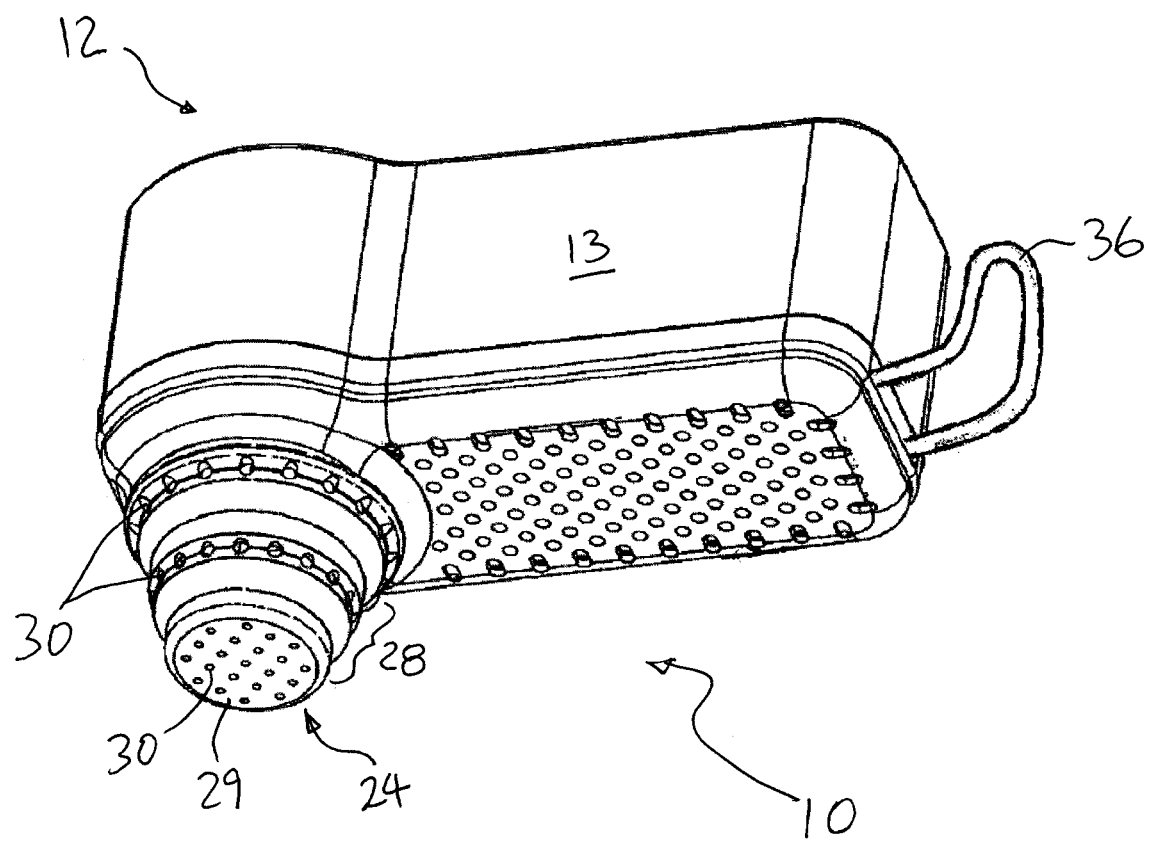
FIG. 9 is a bottom perspective pictorial view thereof.

FIGS. 1-10 illustrate one embodiment of the present invention. The sink organizer 10 includes a container 12 having walls 13 defining an interior. The interior is provided with partition walls 14 to define compartments. In the illustrated embodiment, there are provided two longitudinal, rectangular compartments 16 and one generally square or rounded compartment 18. The longitudinal compartments 16 may be sized to hold, for example, sponges and soap (see FIG. 10). The longitudinal compartments 16 are provided with a bottom liner 22 (FIG. 8). The liner 22 and the partition walls 14 may be an integral or one-piece unit, as shown in FIG. 8, which may be removable to facilitate cleaning.

The liner 22 at the two longitudinal compartments 16 may be at different heights, to provide compartments of different effective depth to accommodate different size items. For example, a small sponge 23 may be placed in the shallower compartment, and a larger sponge 25 may be placed in the deeper compartment, and yet allow the different size sponges to extend from the opening of the compartments 16 to allow easy access to the sponges. The liner 22 illustrated has drainage openings 19, to allow fluid to drain from the compartments 16. The base or bottom 20 of the container 12 below the longitudinal compartments is perforated, to allow fluid from the liner 22 to drain through the bottom of the container 12.

Figure 10:
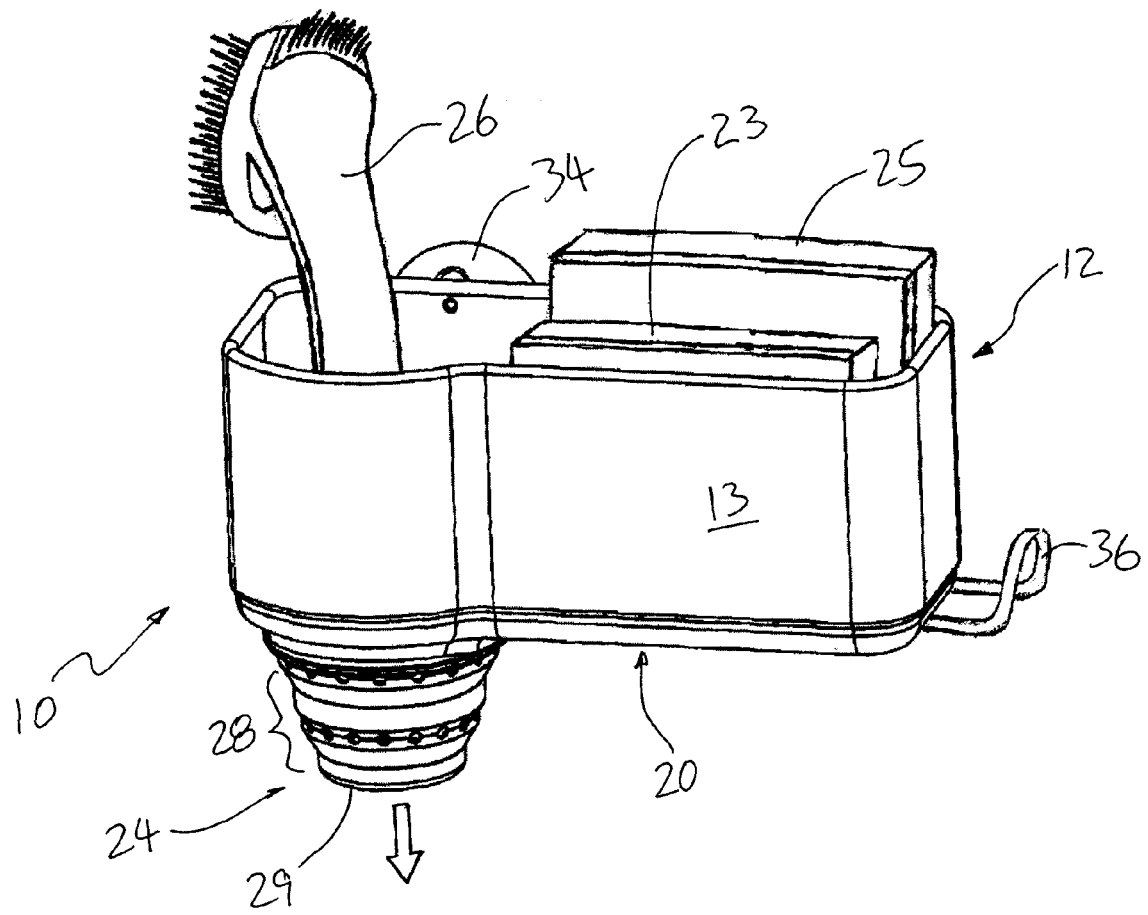
FIG. 10 is another top perspective pictorial view thereof with kitchen tools shown for illustration of the environment of use.
Figure 11:
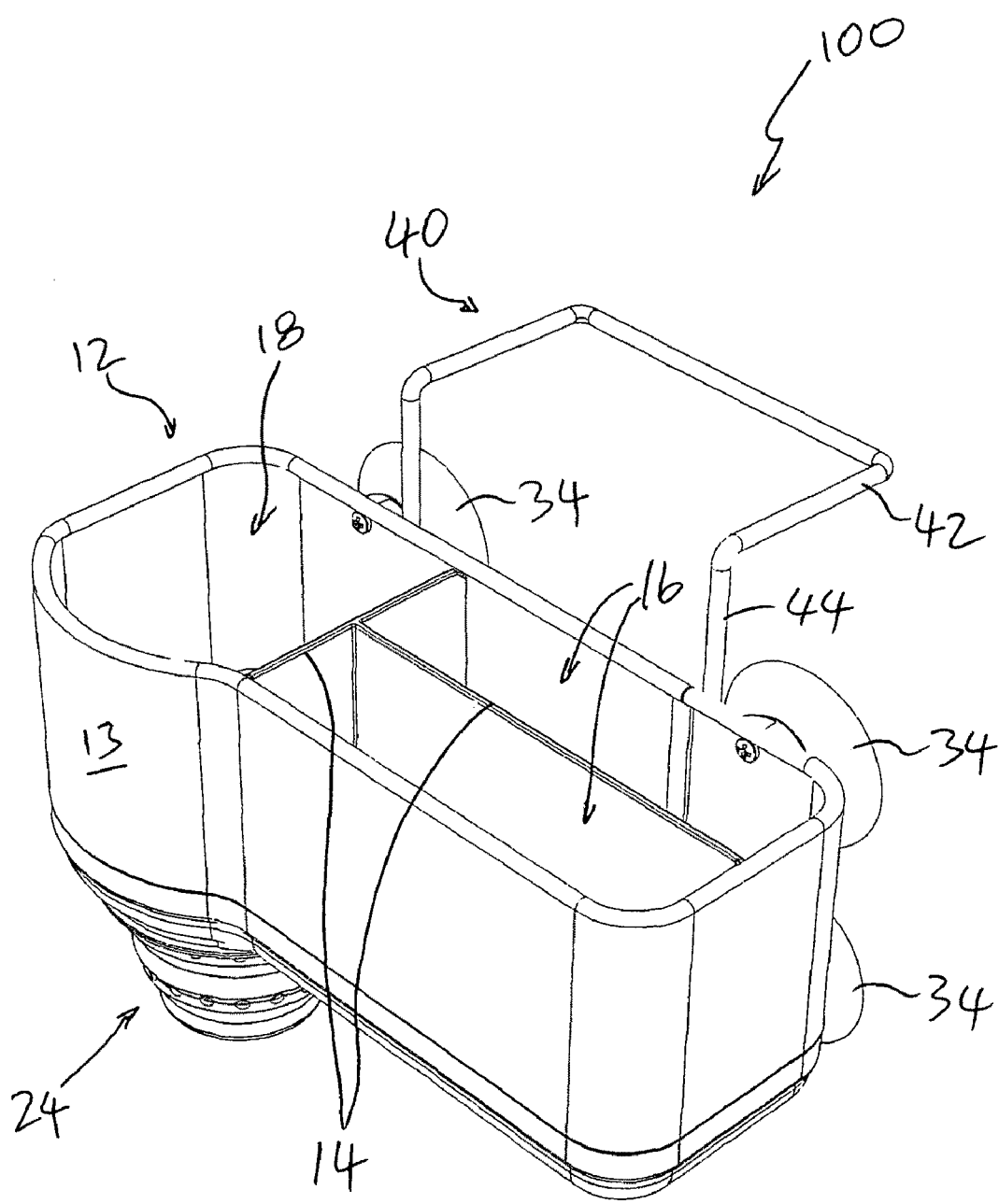
FIG. 11 is a perspective view of a sink organizer in accordance with a second embodiment of the present invention.
Figure 12:
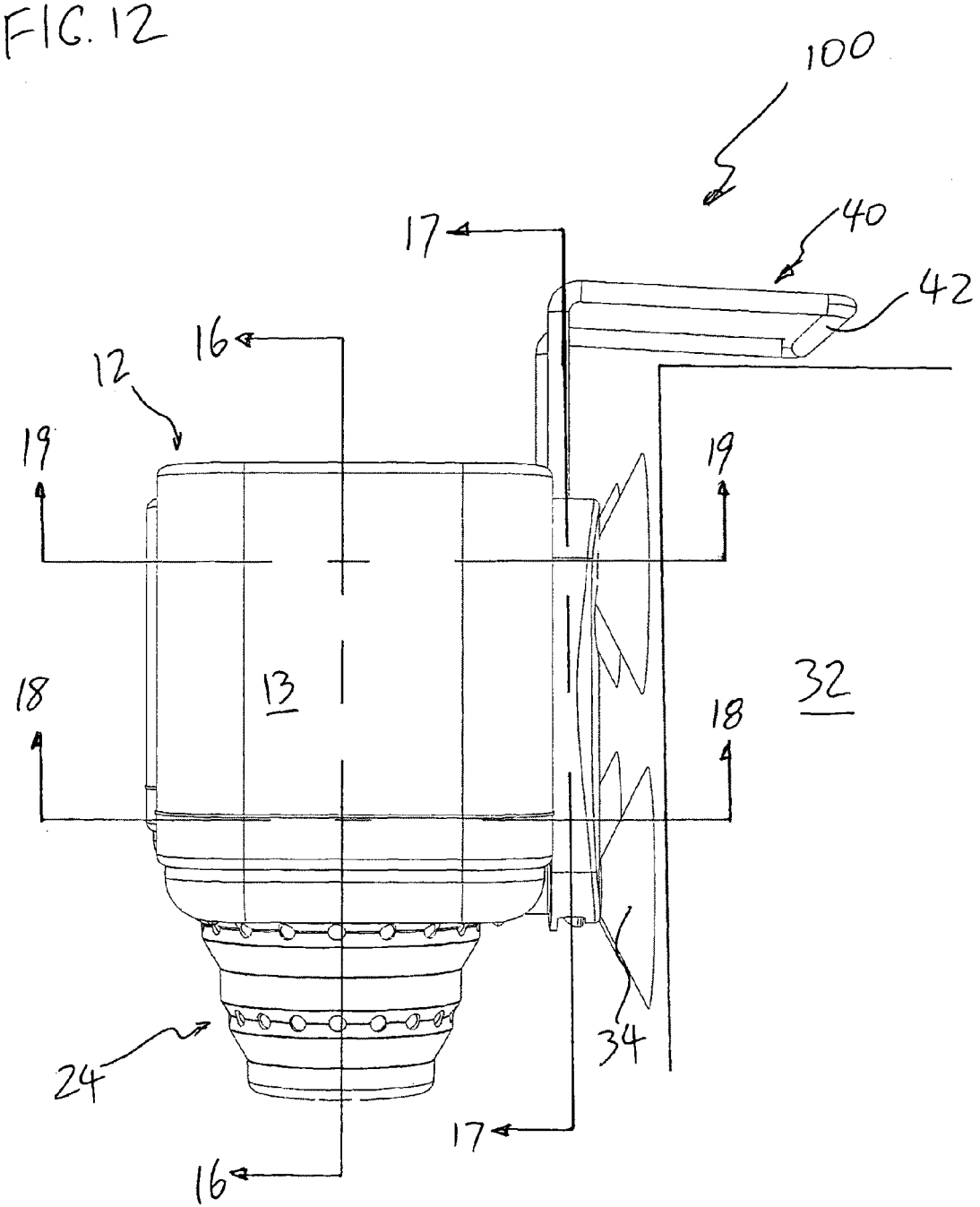
FIG. 12 is a right view thereof.
Figure 13:
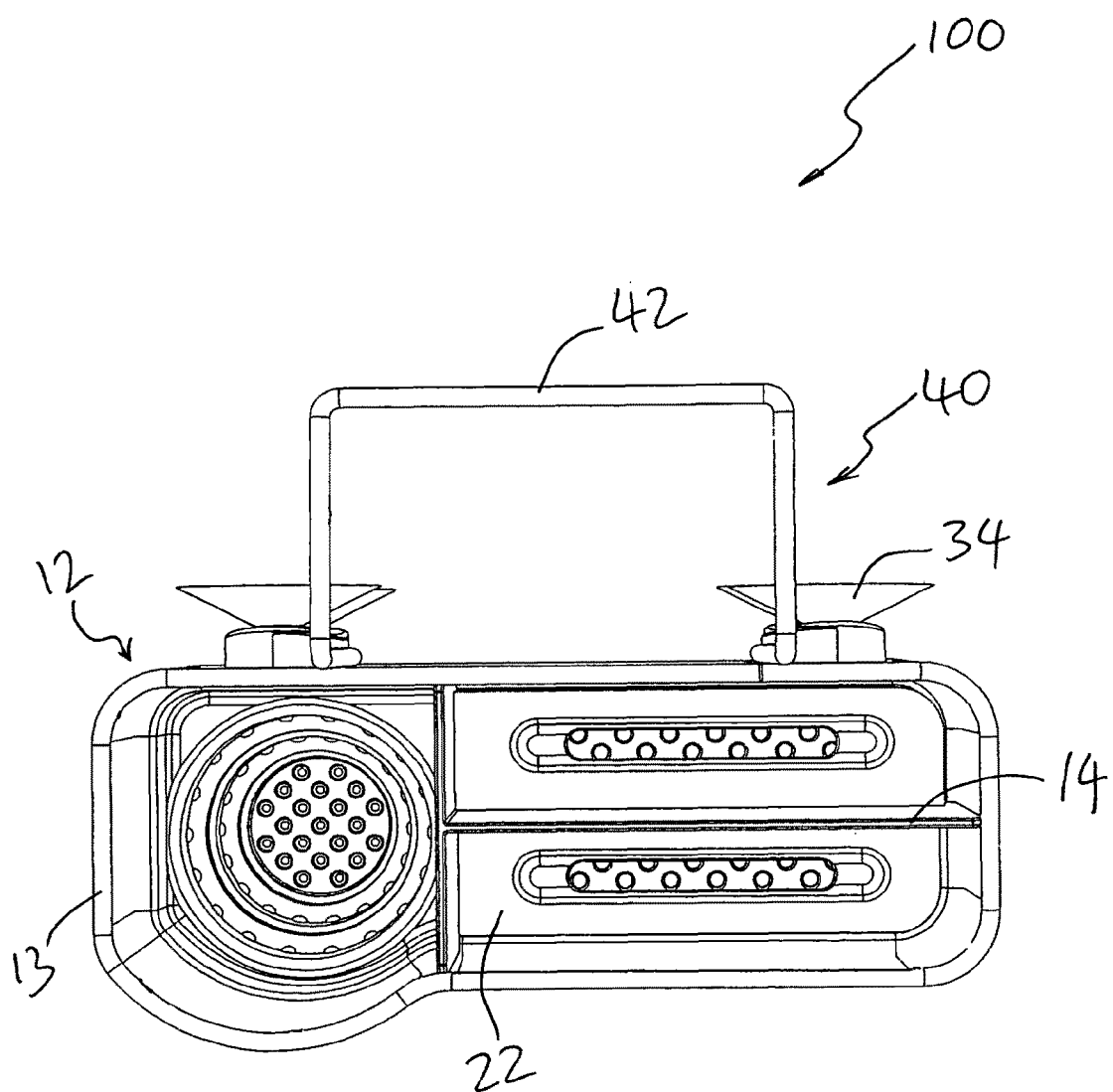
FIG. 13 is a top view thereof.
Figure 14:
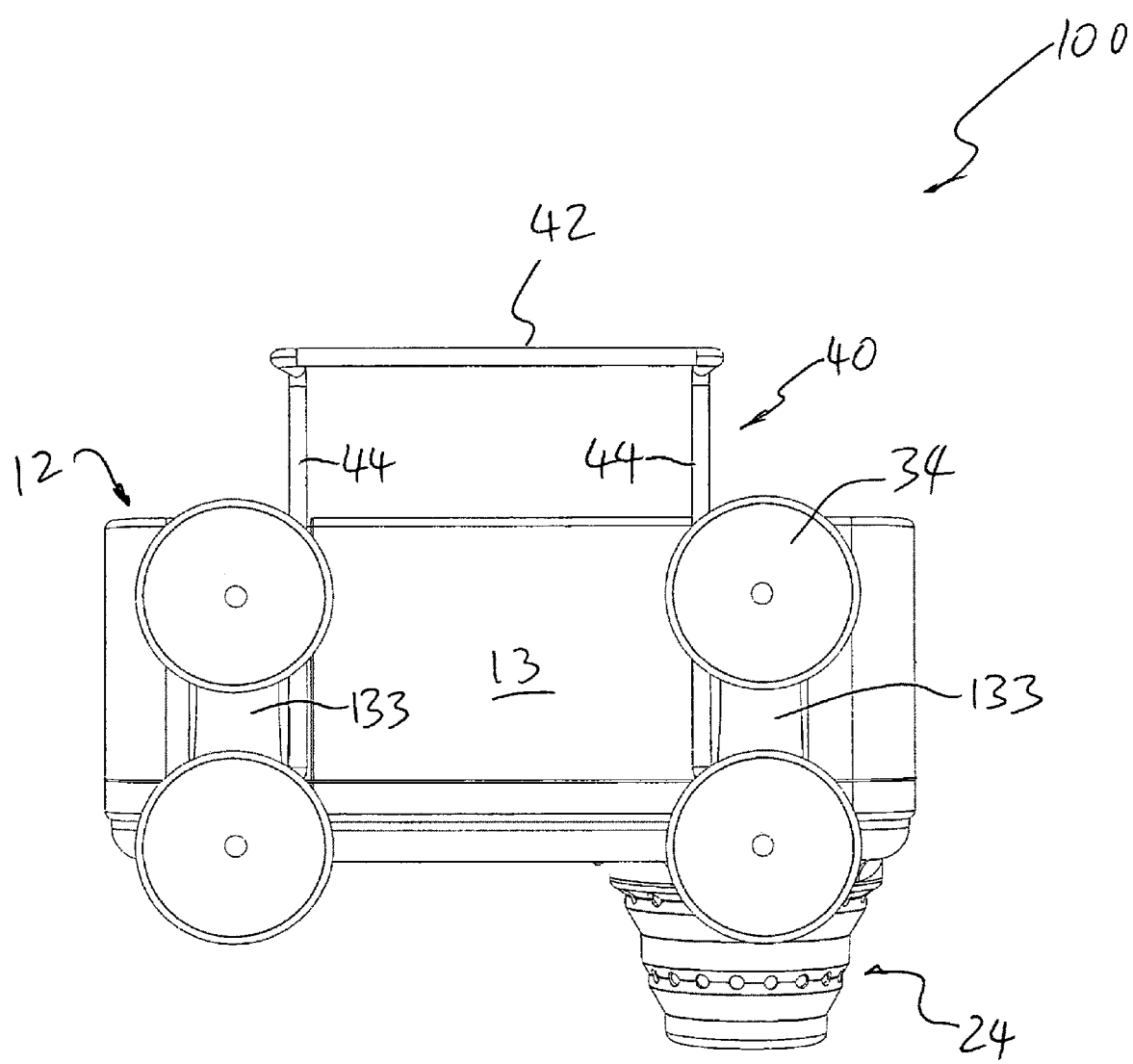
FIG. 14 is a rear view thereof.

In one aspect of the present invention, the organizer includes a section defining a compartment having an extendable or expandable base that provides a deeper holding section with an extended base to support a long slender shaped item, such as a long-handle cleaning brush (see FIG. 10). In the illustrated embodiment, the square or rounded compartment 18 is sized for holding a slender object. The compartment 18 is provided with a base section that is expandable, collapsible and/or extendable, which can be extended or collapsed with respect to the container, such that the depth of this compartment 18 is effectively extended to provide better support of a long slender item such as a long-handle cleaning brush 26, without worrying about the item would tip out of the container.

Figure 16:
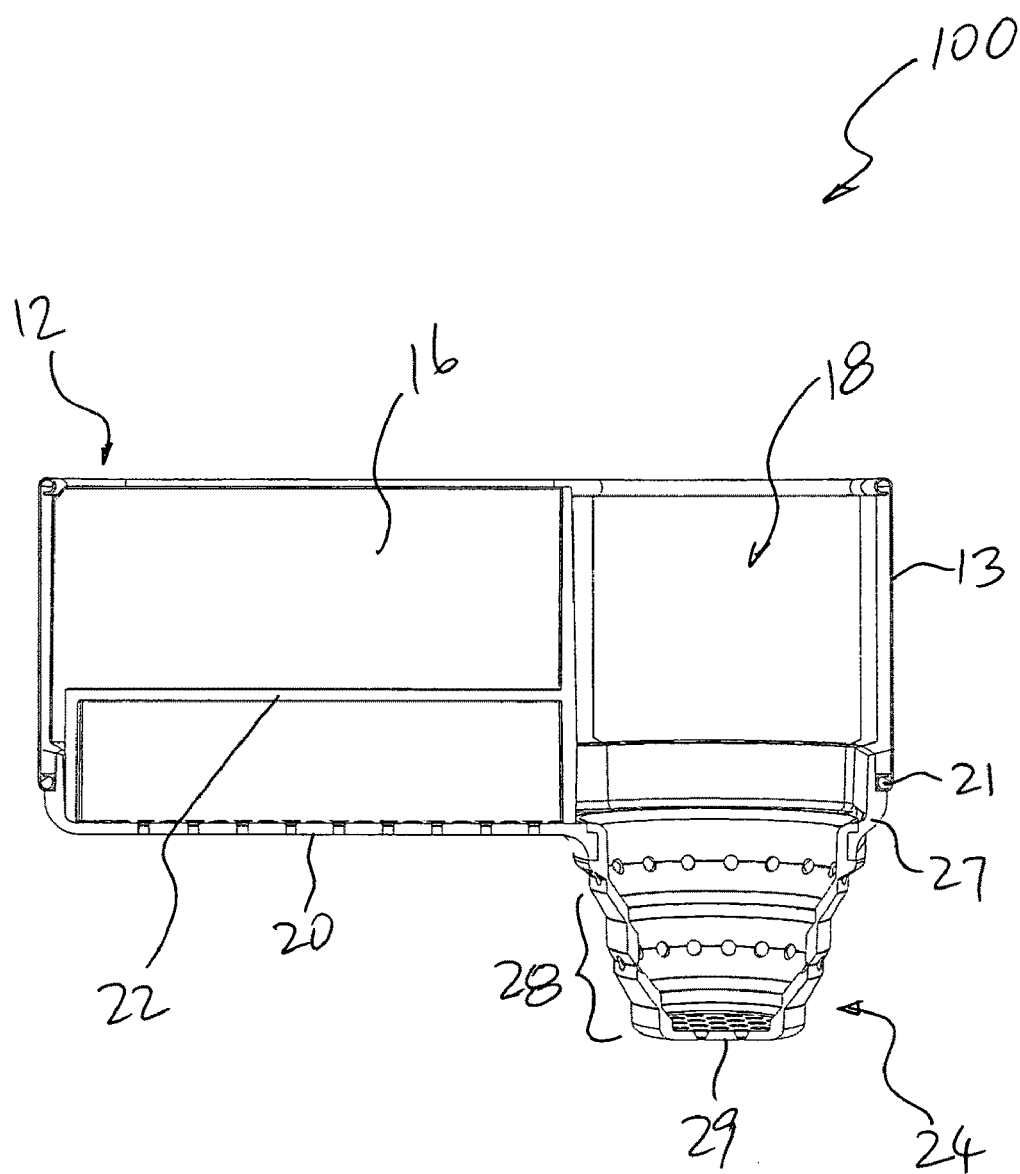
FIG. 16 is a sectional view taken along line 16-16 in FIG. 12.
Figure 17:
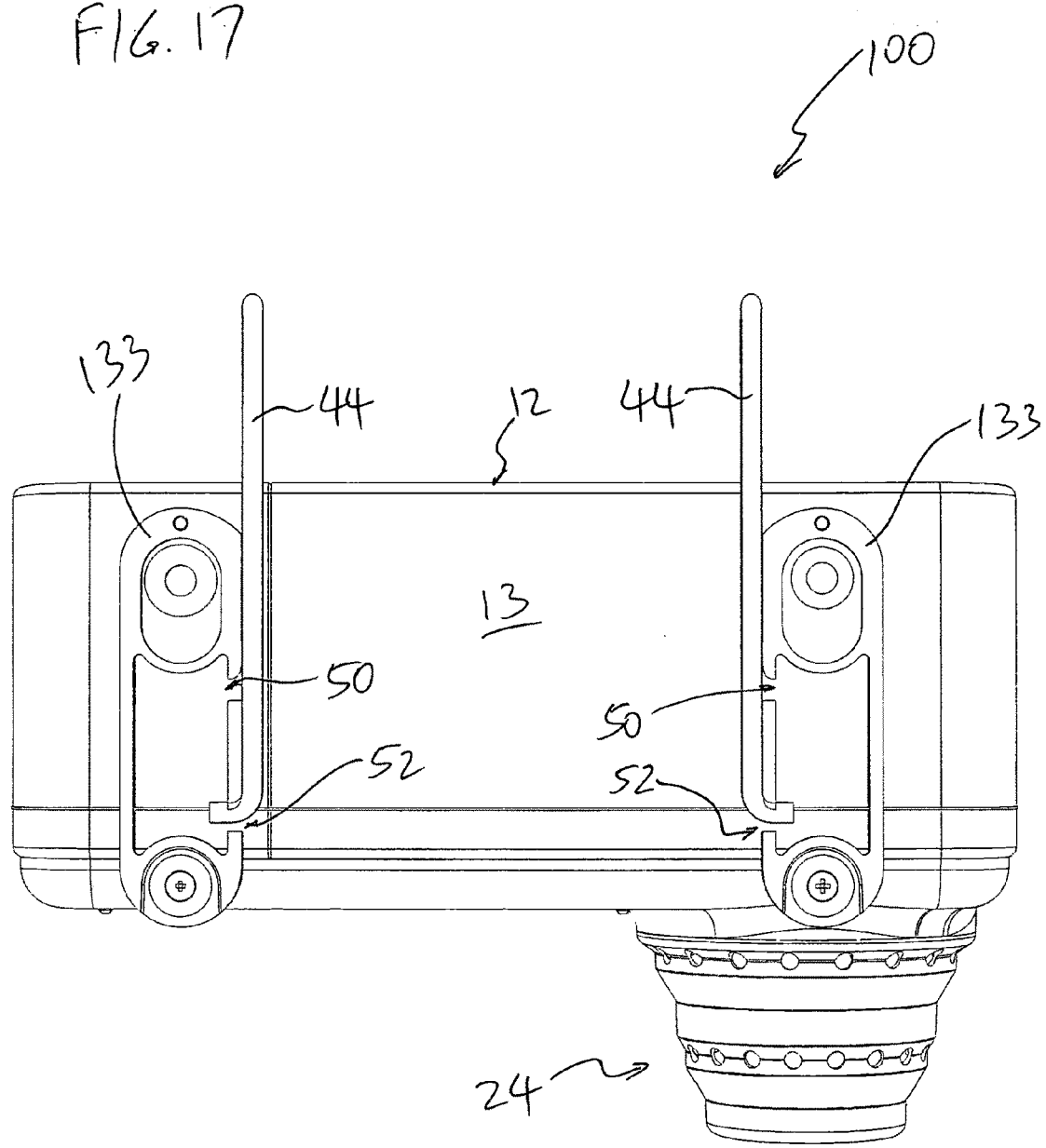
FIG. 17 is a sectional view taken along line 17-17 in FIG. 12.
Figure 18:
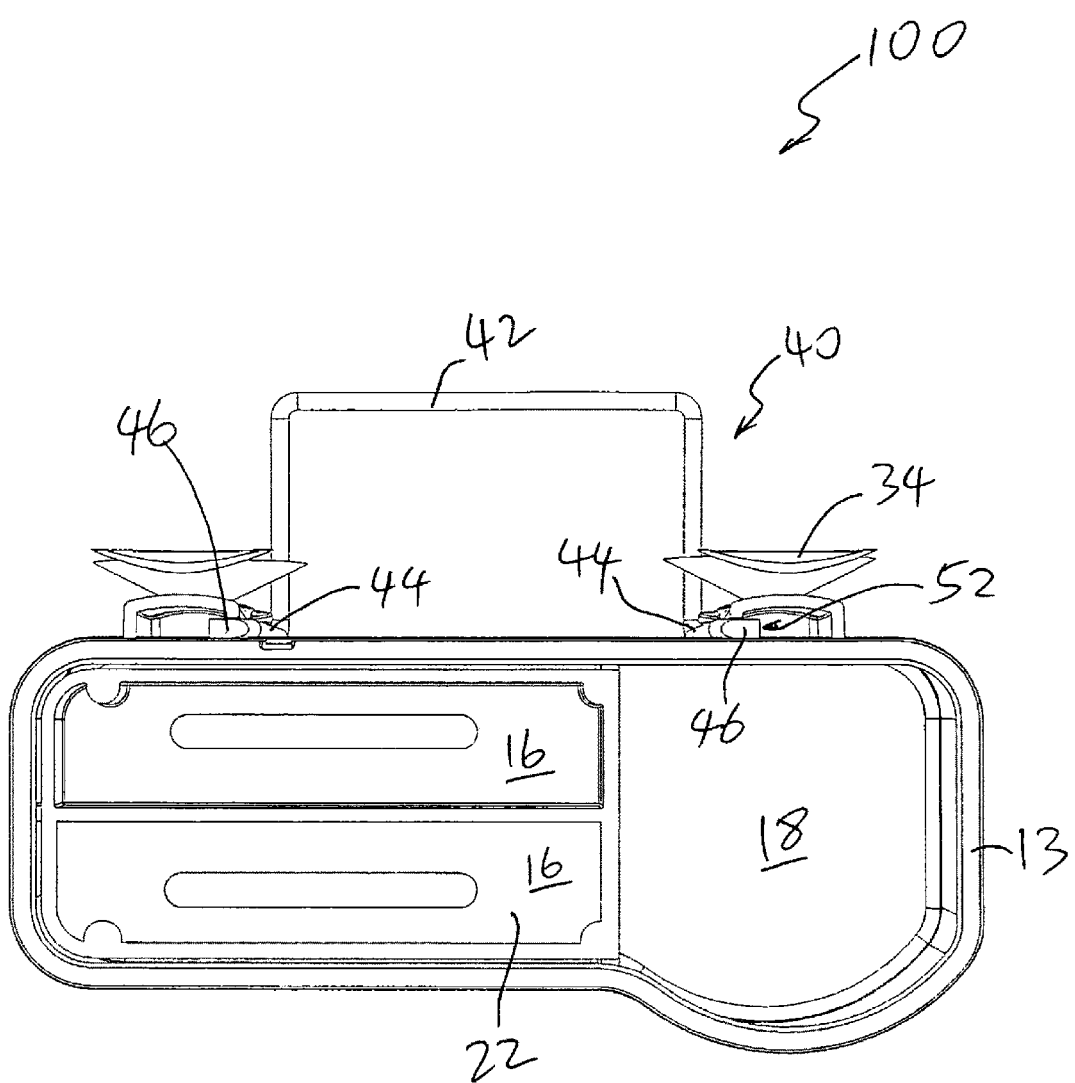
FIG. 18 is a sectional view taken along line 18-18 in FIG. 12.
Figure 19:
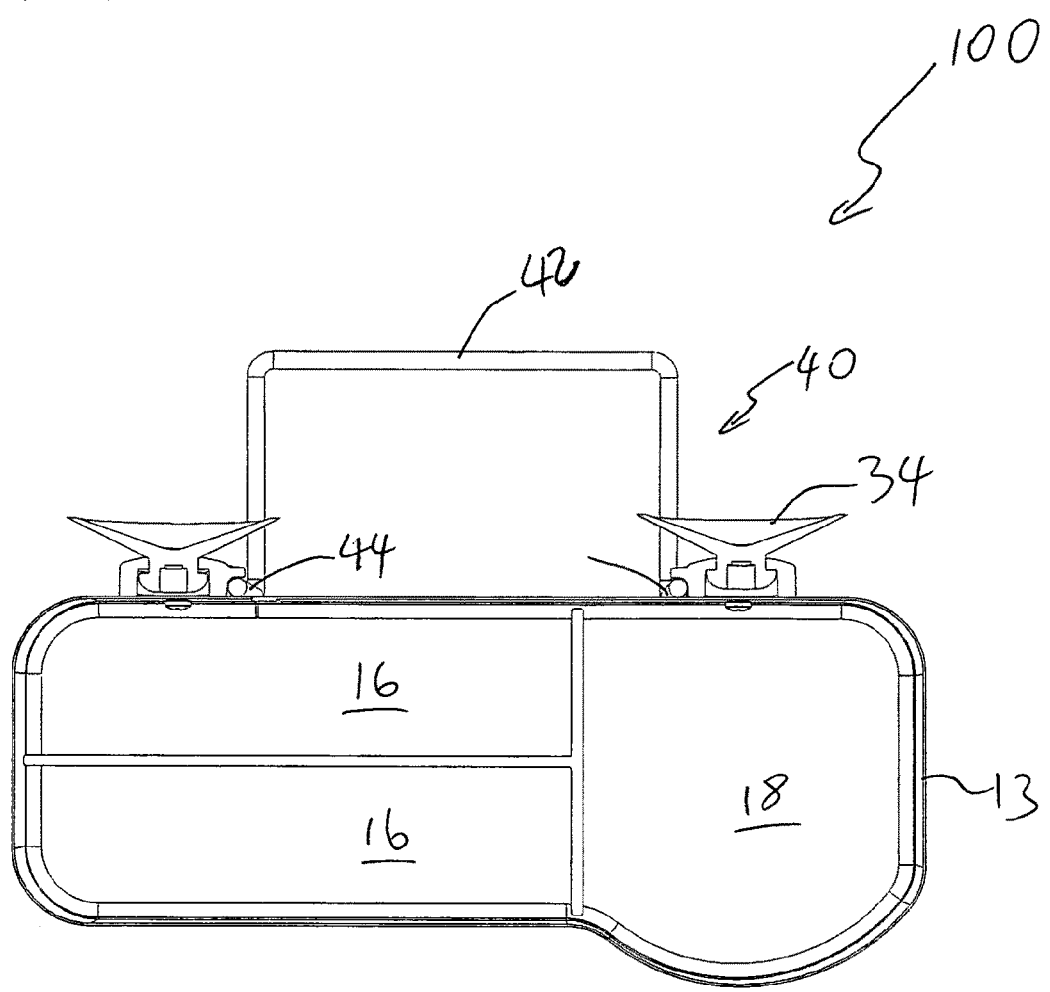
FIG. 19 is a sectional view taken along line 19-19 in FIG. 12.

The expandable base 24 may be implemented with a telescopic structure, which may be in the form of an accordion-like structure having axially folding annular sections (see FIG. 16, for example) or other form of axially collapsible, expandable and/or extendable structure (e.g., a concentric coupling of a series of nested and axially interlocking cylindrical collars of gradually reducing dimensions). In the illustrated embodiment, the expandable base 24 is made of a one-piece molded flexible material, such as rubber or silicone, which is structured to include axially expandable folding annular sections 28 having gradually reducing diameters at axial distances further away from the bottom of the container 18, and a perforated bottom 29 (see FIG. 16, which embodiment shares similar structure of the expandable base 24). The expandable base 24 is coupled to the bottom rolled edge 21 (see FIG. 16) of the container wall by means of a mounting bracket 27. The mounting bracket 27 facilitates attachment of the rubbery material of the expandable base 24 to the rolled edge of the container wall. Perforations 30 are provided also along the sides of the axially folding annular sections. The perforations 30 provide drainage of the compartment 18.

Figure 1:
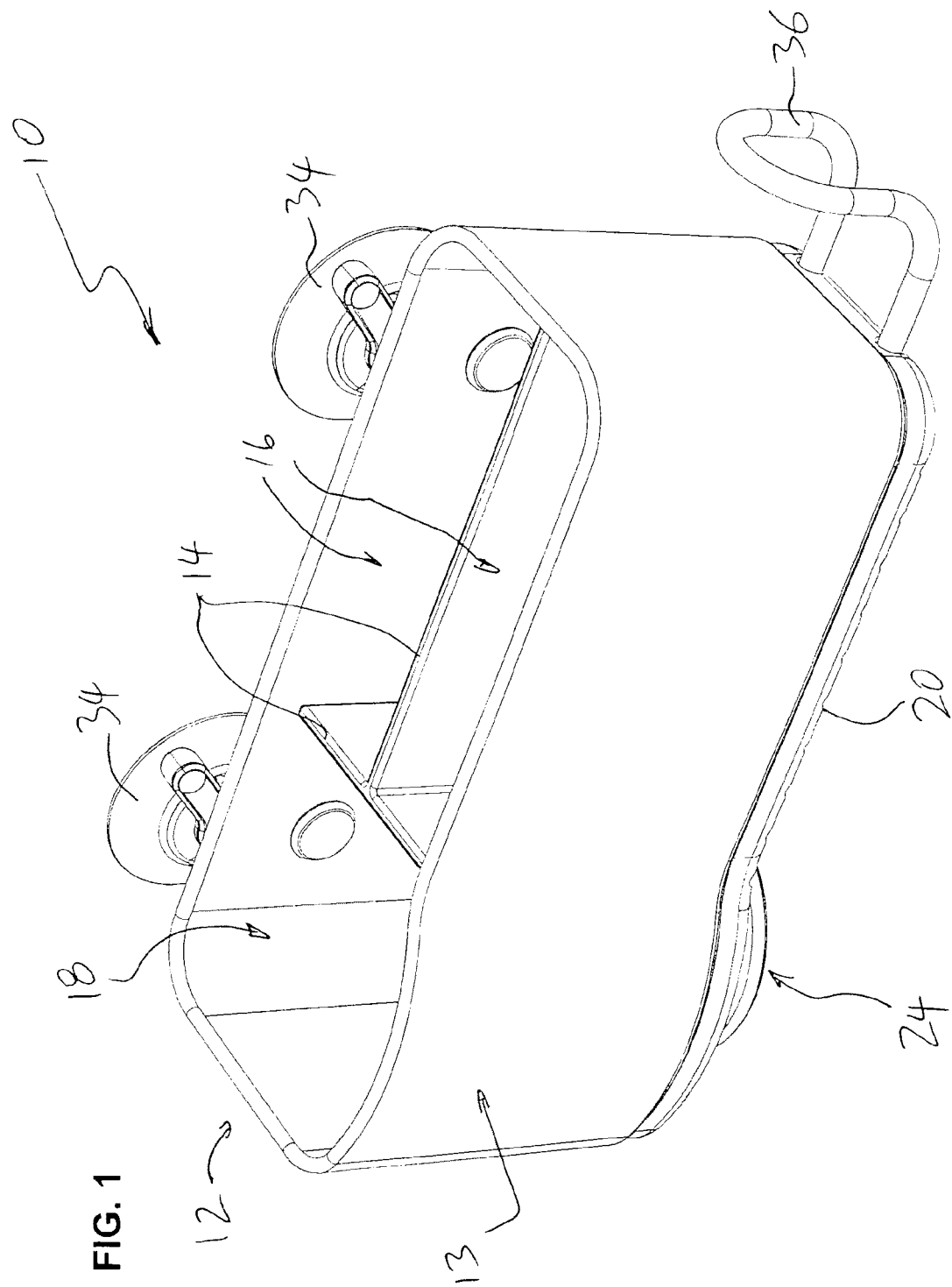
FIG. 1 is a perspective view of a sink organizer in accordance with one embodiment of the present invention.
Figure 2:
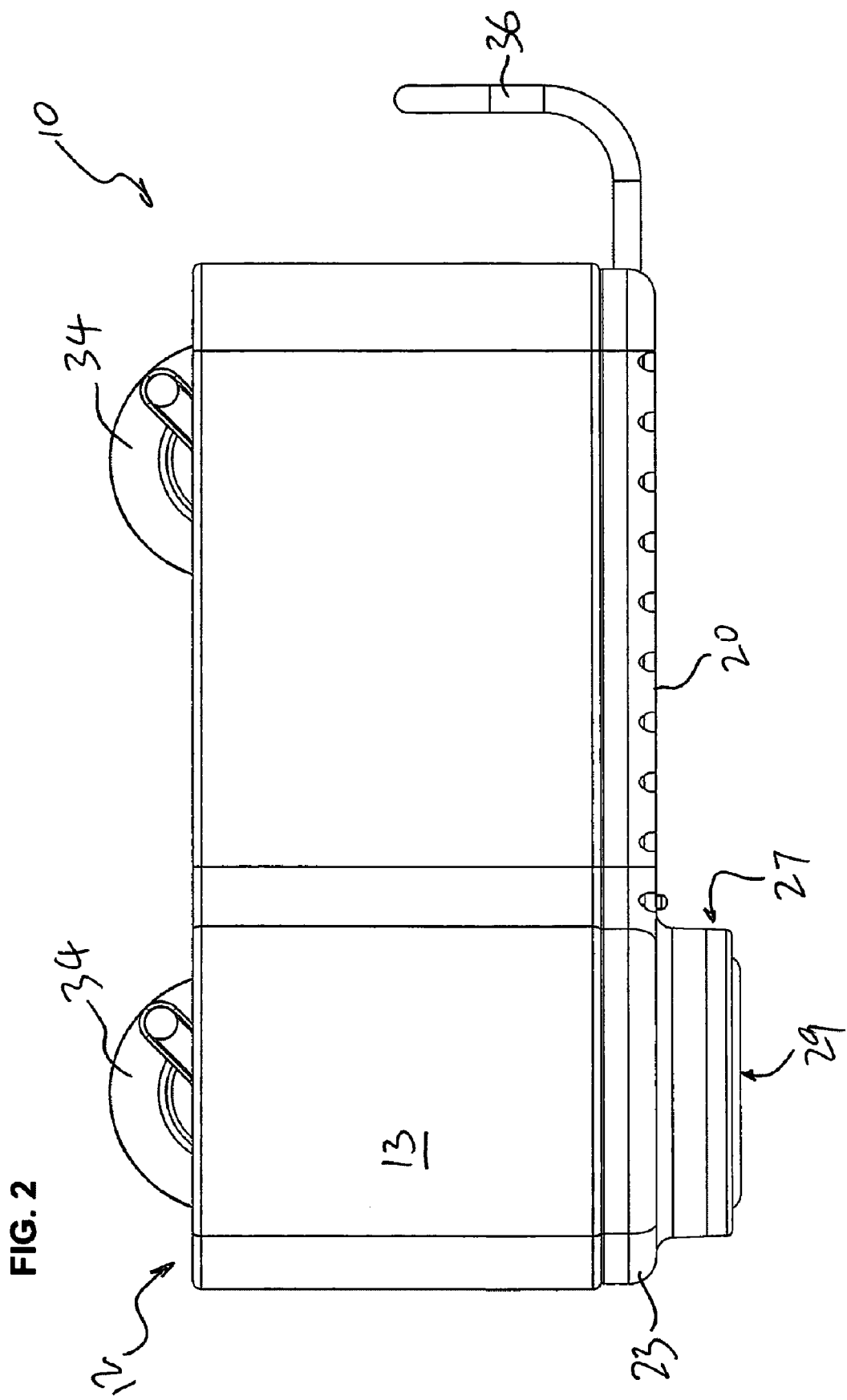
FIG. 2 is a front view thereof.
Figure 3:
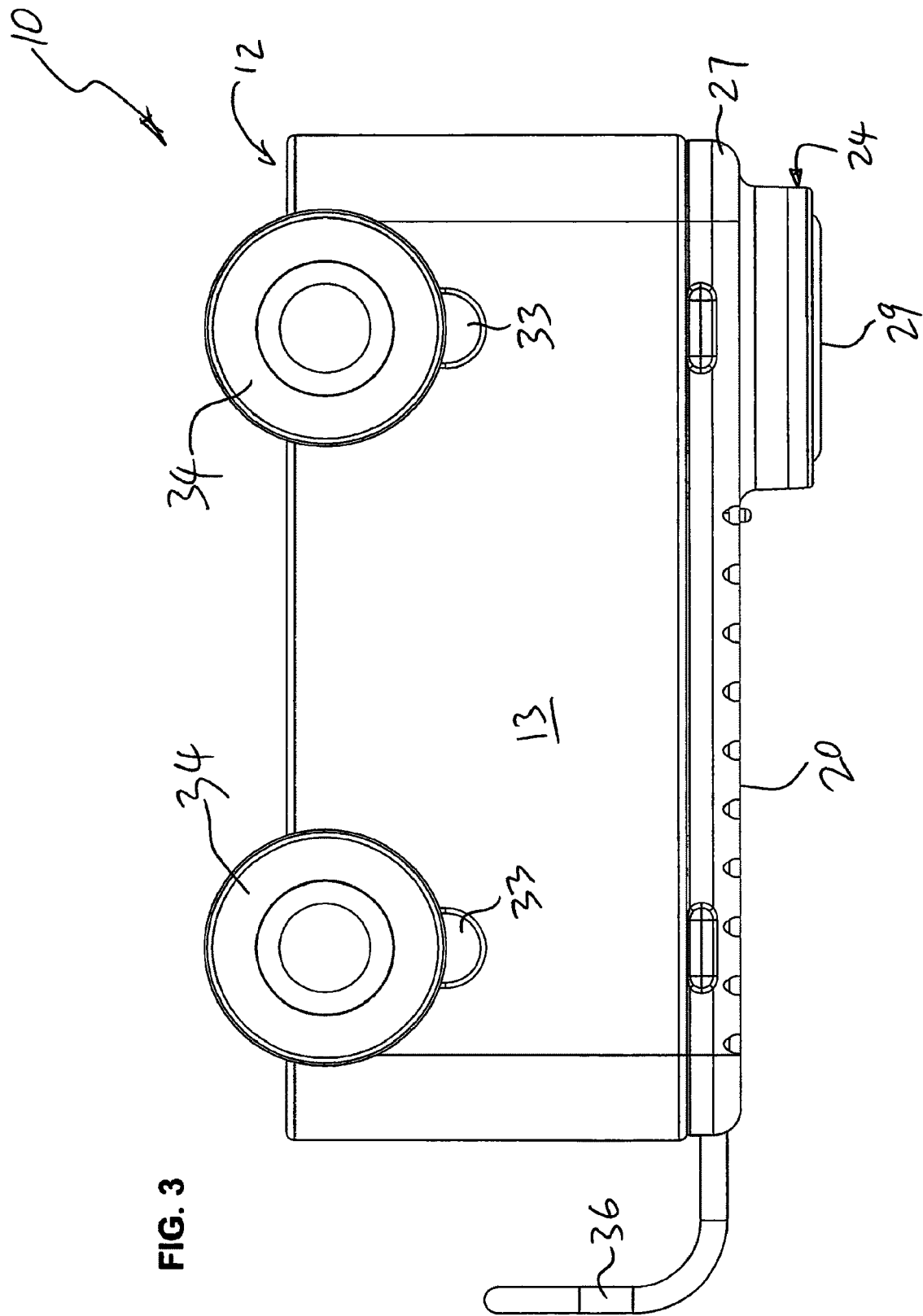
FIG. 3 is a rear view thereof.
Figure 4:
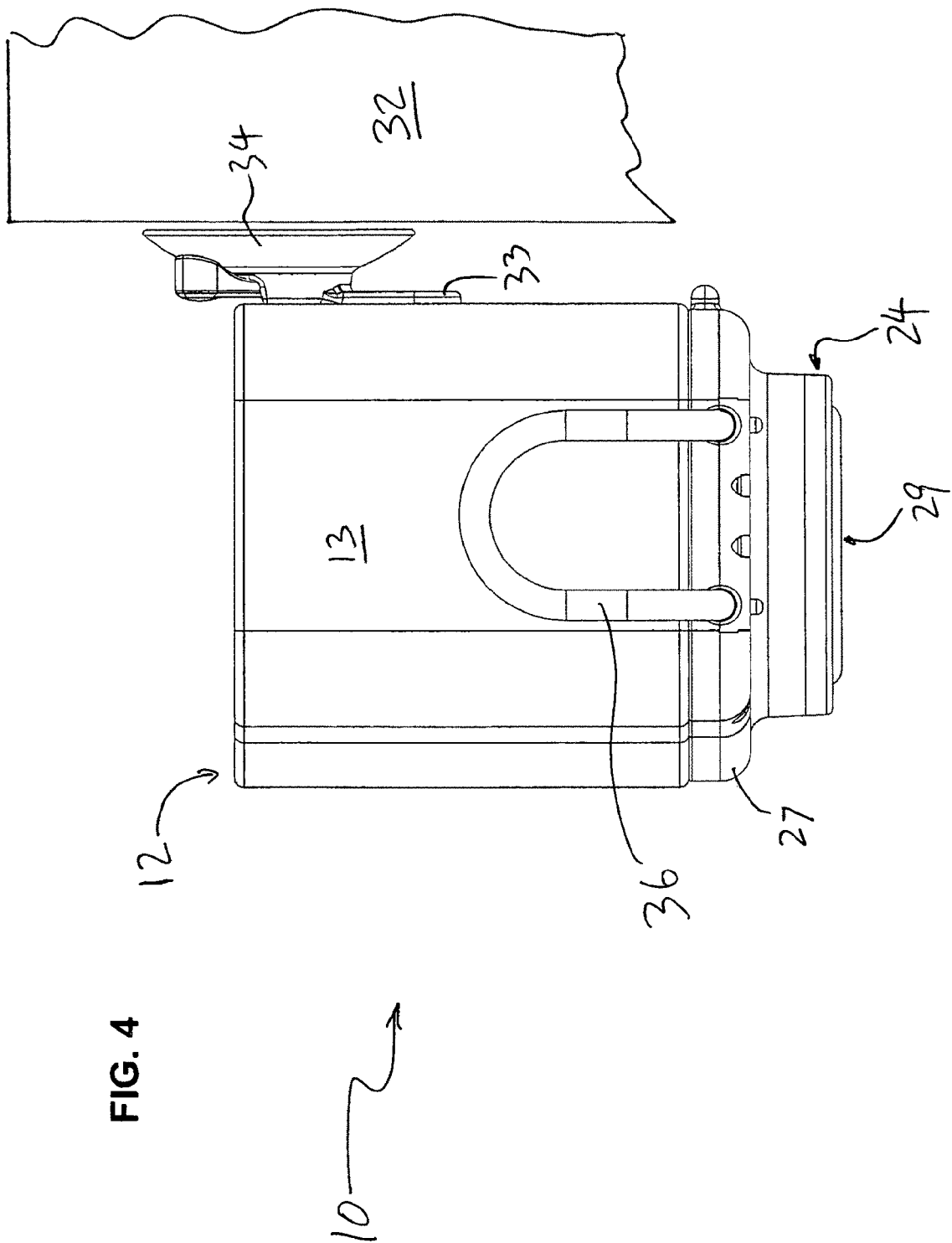
FIG. 4 is a right side view thereof.
Figure 5:
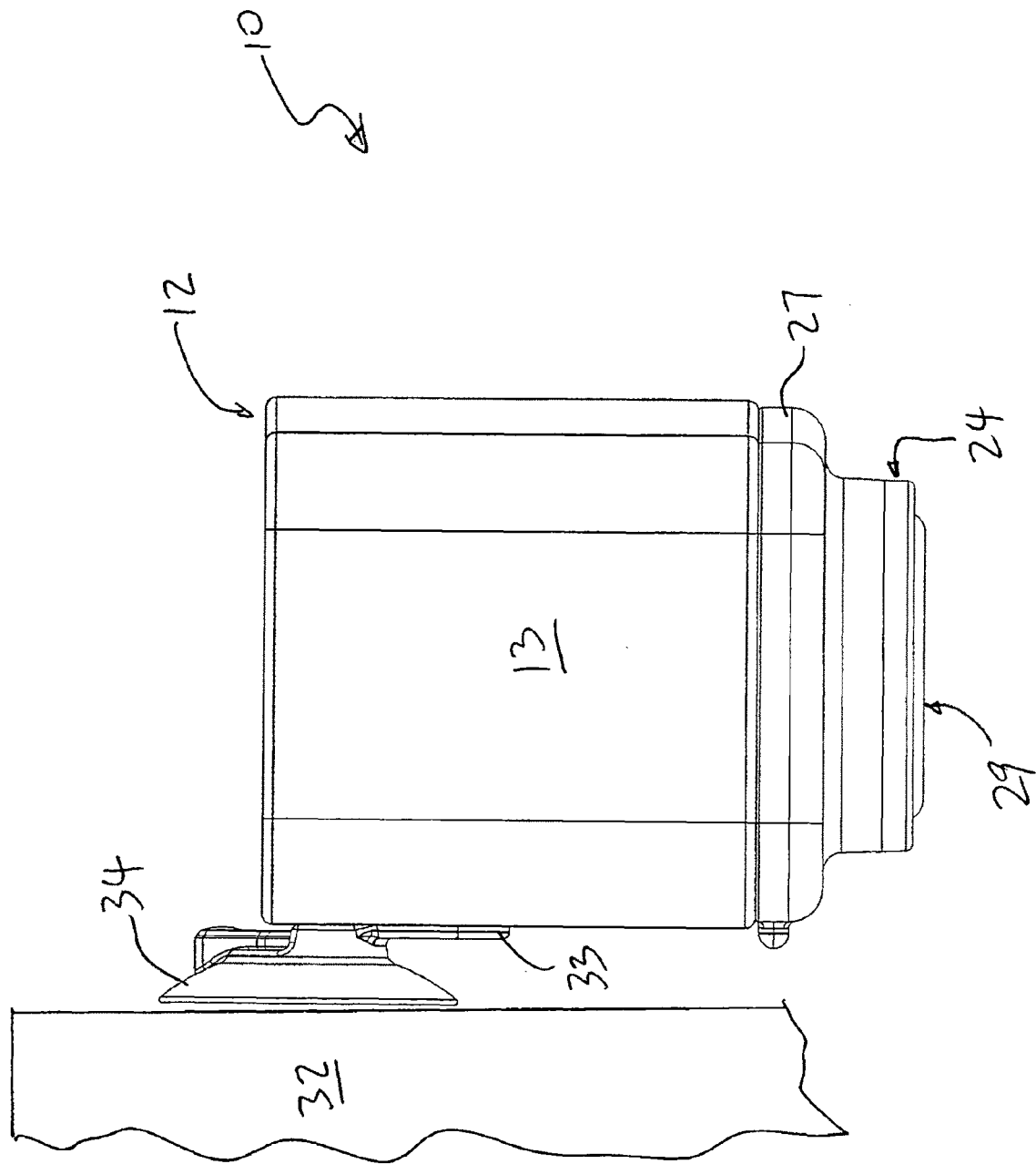
FIG. 5 is a left side view thereof.
Figure 6:
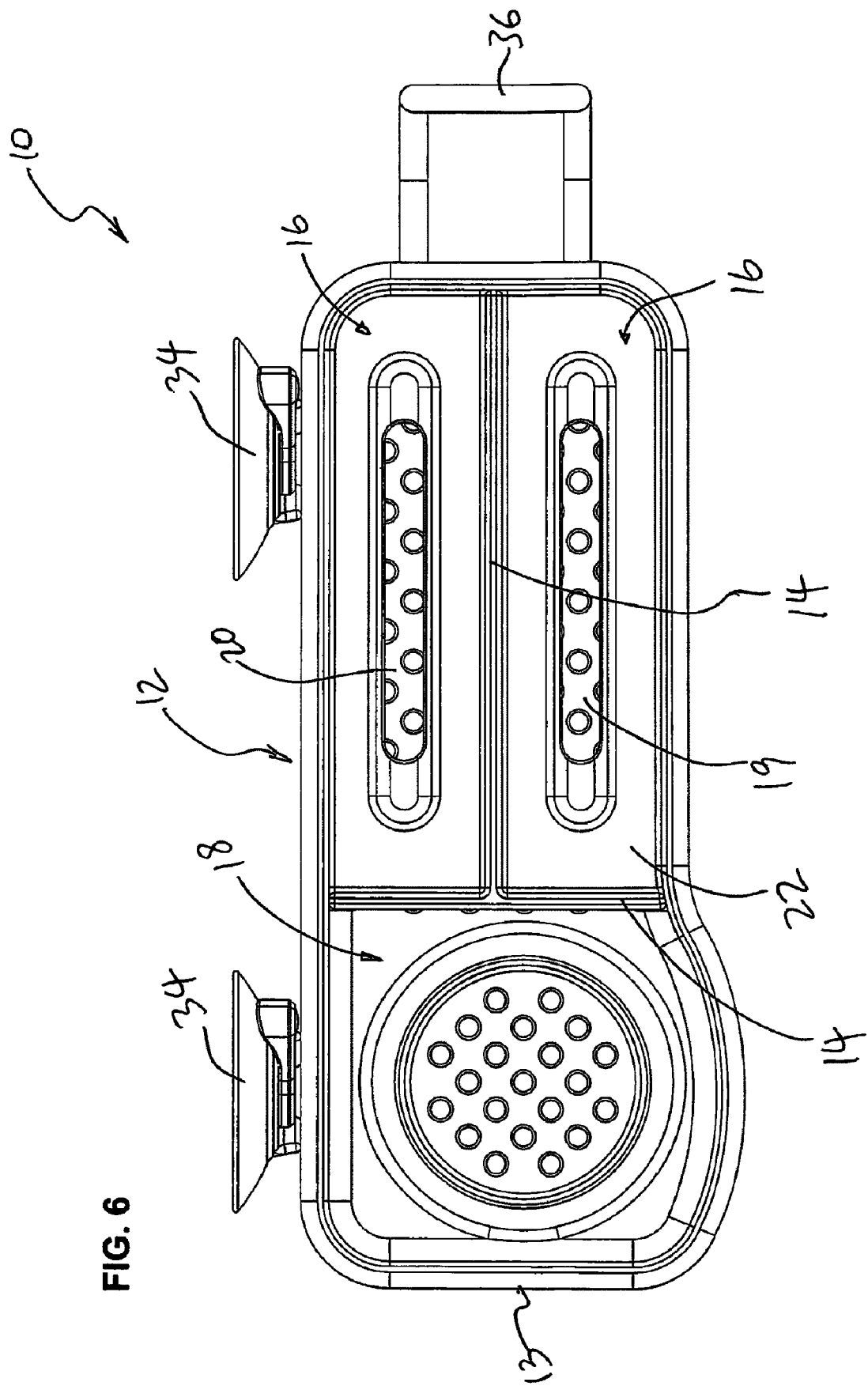
FIG. 6 is a plan view thereof.
Figure 7:
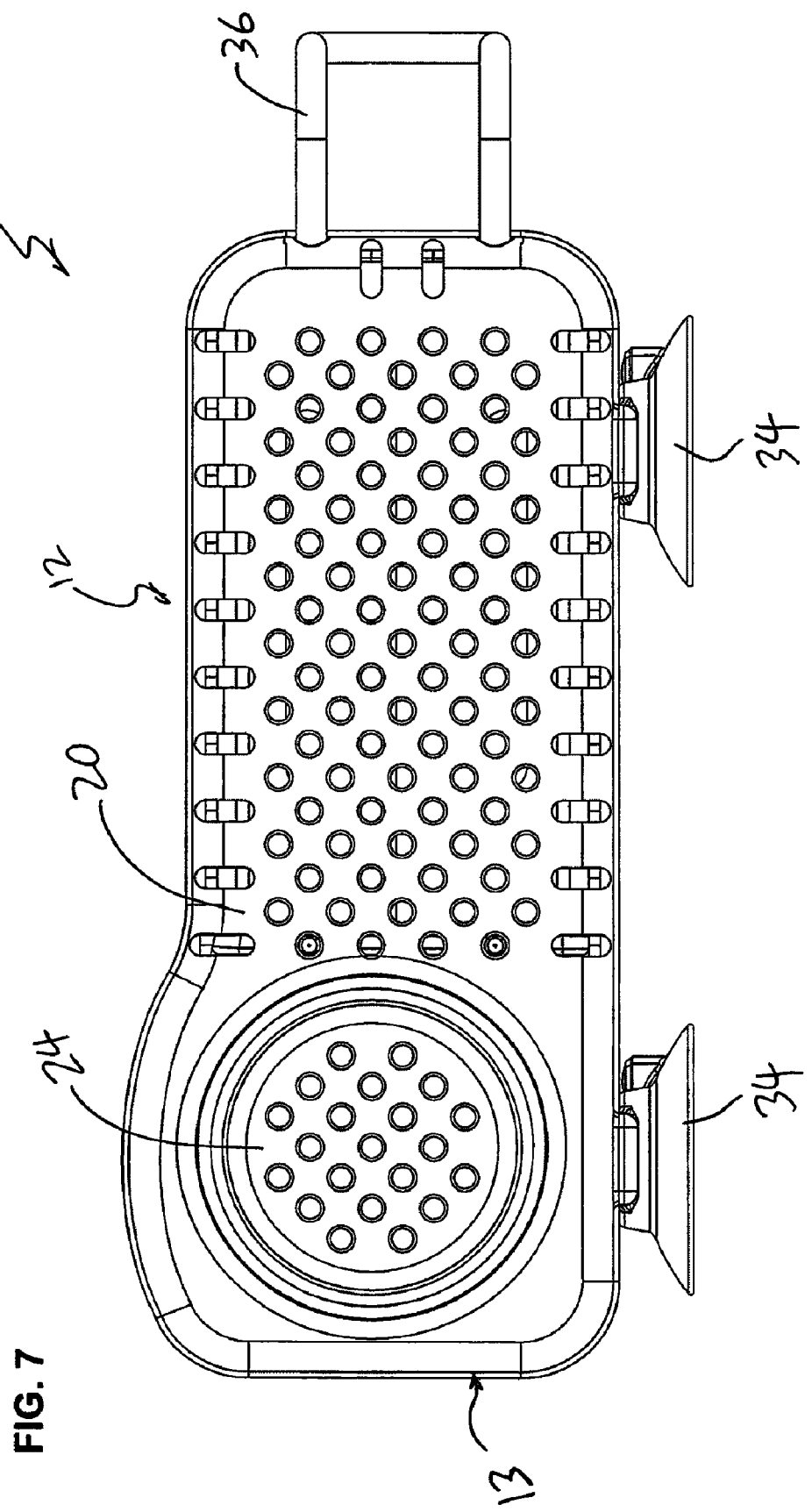
FIG. 7 is a bottom plan view thereof.

The axially folding annular sections 28 may be collapsed with the axially folding annular sections concentrically nested, to present a base substantially flush with the bottom 20 of the remaining sections of the container 12, or slightly protruding as shown in the embodiment of FIG. 2. When it is needed to store a cleaning brush 26, for example, the expandable base 24 of this compartment 18 is extended downwardly by pushing on the bottom 29 of the expandable base 24, which bottom 29 extends substantially beyond the bottom 20. When the compartment 18 is not in use, the expandable base 24 may be collapsed by pushing up from the bottom 29, to fold the axially folding annular sections.

To facilitate mounting of the sink organizer 10 to the wall of a sink basin 32 (schematically shown in FIGS. 4 and 5), one or more suction cups 34 are provided on one exterior wall of the container 12 of the sink organizer 10. In the illustrated embodiment, the suction cups are attached to mounting brackets 33, for example by means of hook-and-eye coupling typically used for suction cup mountings. One or more hooks 36 or other attachment supports may be provided on the side of the container, to support items such as a wash towel.

Referring to FIGS. 11-19 illustrated another embodiment of the present invention. This embodiment of the organizer 10 is similar to the embodiment of the organizer 10 in FIGS. 1-10, with the exception of a rear bracket and the variation in the configuration of suction cup mounting. In another aspect of the present invention, a bracket 40 is attached to the side wall of the container 112 of the sink organizer where the suction cup mounting is also provided (e.g., at the rear of the container on the side facing the sink wall). The bracket 40 has a handle 42 in the form of a bent extended end, which is configured to hang onto or rest against the top edge of the sink 35, thus providing additional support for stabilizing the sink organizer 100 after it is attached to the sink wall by the suction cups 34. With the bracket 40, the sink organizer 100 is stabilized when items are being placed and removed from the compartments 16 and 18 in the sink organizer 100. The support of the handle 42 on the top edge of the sink 35 also prevents the sink organizer 100 from slipping at the suction cup mounting especially when wet, thus preventing sliding of the sink organizer 100 down the sink wall.

Figure 15:
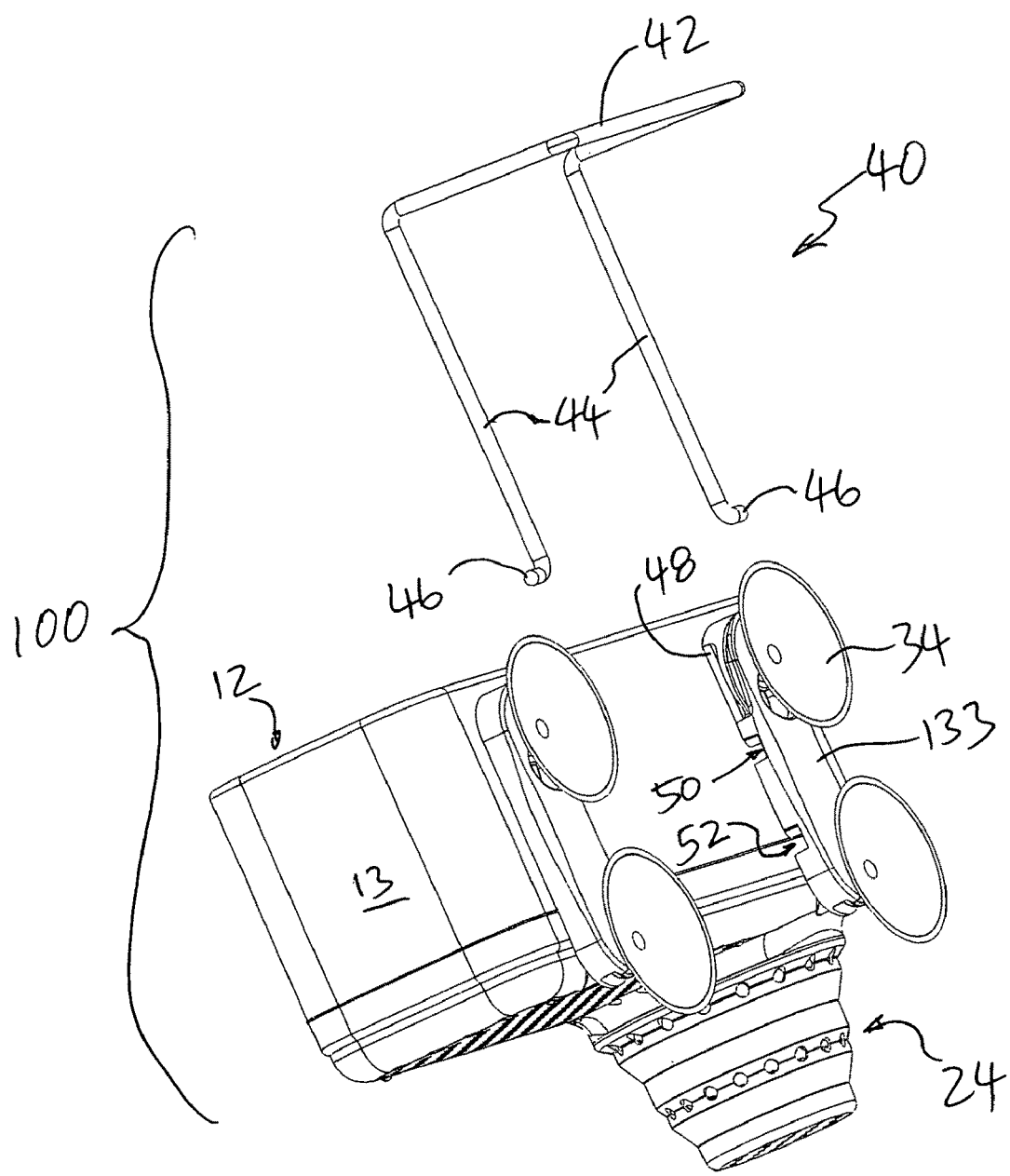
FIG. 15 is an exploded rear perspective view thereof.

In one embodiment, the bracket 40 is attached to the side wall of the container 12 of the sink organizer 100 in a manner that allows adjustment of the height of the handle 42 above the container 12. Referring to FIG. 15, the bracket 40 comprises a bent metal wire frame, forming the handle 42 at the end of parallel arm sections 44. The handle 42 may be coated with PVC or other protective, non-corrosive material to provide corrosion protection. The arm sections 44 each terminates with a hook end 46. Stops (e.g., fasteners or mechanical interlocks) are provided to securely retain the arm sections 44 at two or more predefined height positions to prevent from unintended sliding of the handle 42 with respect to the container 12. In the illustrated embodiment shown in FIGS. 15, 17-19, the mounting brackets 133 for the suction cups 34 define tracks 48 to receive and support the arm sections 44, and indexing holes 50 and 52 to lock the hook ends 46 of the arm sections 46 with respect to the container 12. The track 48 is in the form of a groove that receives and supports the side of the arm sections 44. The holes 50 and 52 provide indexing between two locking positions at which the hook ends 46 can be secured to the mounting bracket 133. Alternatively, in another embodiment not illustrated, other means of fastening or locking the arm sections 44 may be implemented without departing from the scope and spirit of the present invention. For example, the arm sections and mounting brackets 133 may be configured to provide slidably variable height adjustment without discrete indexing positions.

Given the longer mounting brackets 133 in this embodiment, additional suction cups can be provided, which provides better stability of the sink organizer 100.

Figure 20:
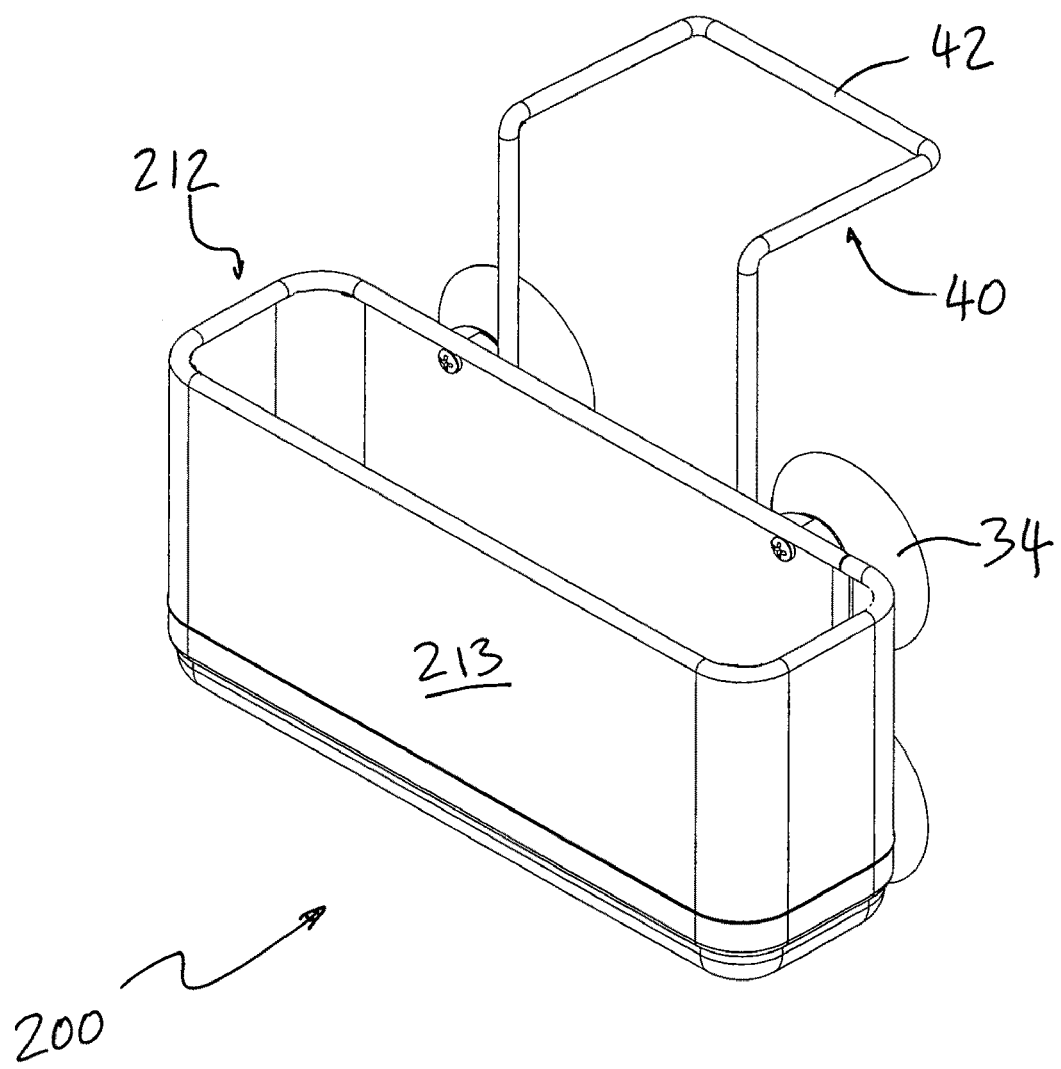
FIG. 20 is a top perspective view of a sink organizer in accordance with a third embodiment of the present invention.
Figure 21:
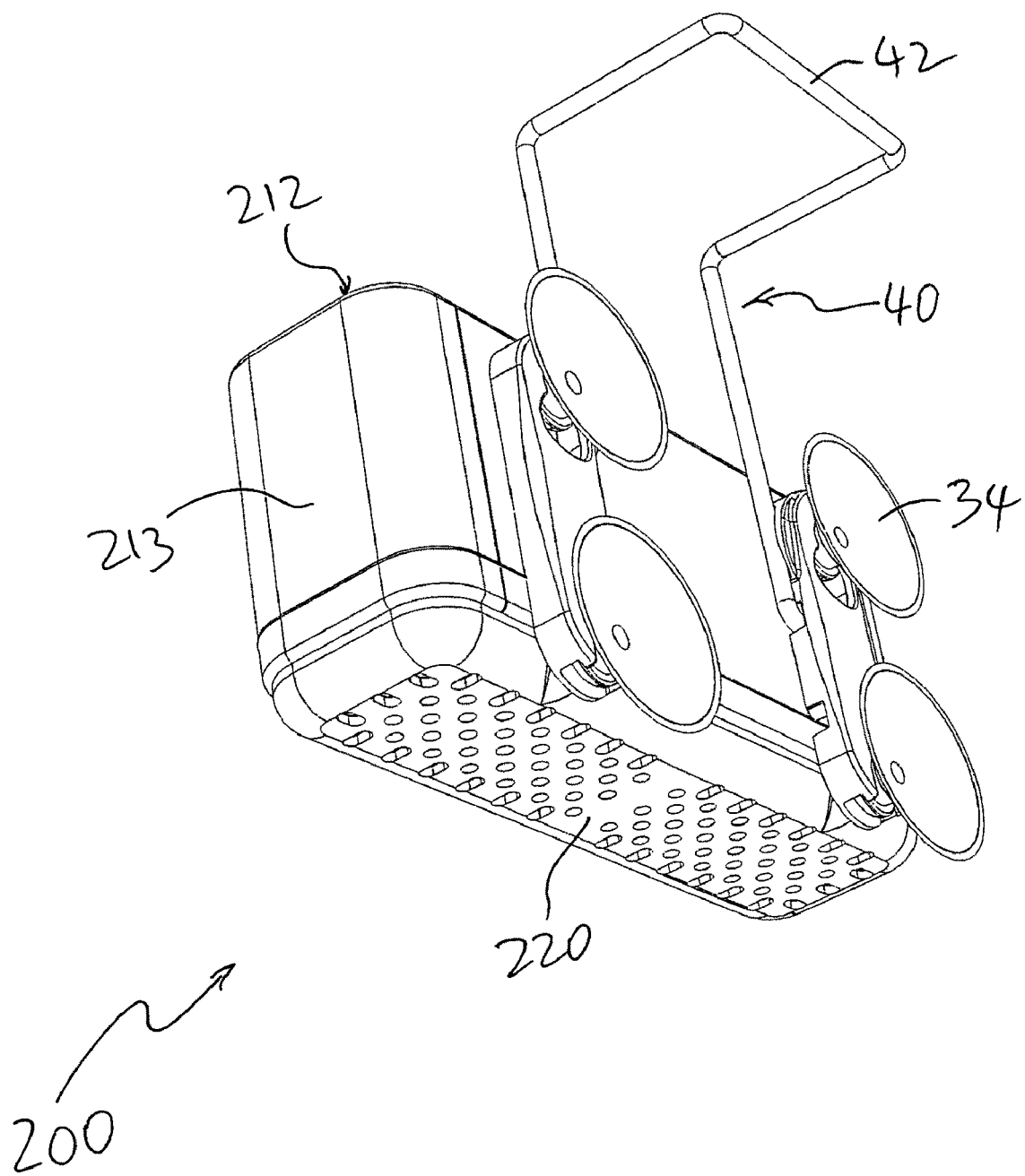
FIG. 21 is a bottom perspective view thereof.

FIGS. 20 and 21 illustrate a further embodiment of a sink organizer of the present invention. This embodiment also has a bracket 40, but without a compartment having an expandable base. In this embodiment, the bottom 220 extends along the entire base of the container 212. The walls 213 of the container 212 have an interior with a symmetrical shape, as compared to the presence of the combination of the rounded compartment 18 and longitudinal compartments 16 in the previous embodiments.

The components of the sink organizers 10, 100 and 200 may be formed by extrusion, molding, etc. The components may be made of metal (e.g., steel, aluminum, alloys, etc.), synthetic material (e.g., silicone, rubber, plastics, polymeric materials) or natural material (e.g., wood, bamboo, etc.), which may possess a painted, coated, smooth, polished, brushed, textured, etc. finish. For example, the containers 12 and 212 may be made of sheet steel, the bottoms 20 and 220 may be made of ABS plastics, and the flexible expandable base 24 may be made of silicone or rubber. A combination of materials and finishes may be implemented to achieve the desired structural integrity and aesthetic appeal for the illustrated embodiments.

* * *

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:
1. A sink organizer, comprising:
a container defined by side walls including a support side wall;
at least a first compartment defined in the container, wherein the first compartment comprises an expandable base having a first perforated bottom, and wherein the expandable base is expandable in a direction to lower the first perforated bottom vertically into a sink with respect to the support side wall of the container; and
suction cups provided on the support side wall of the container for attaching the support side wall of the container to a side wall of the sink.

2. The sink organizer as in claim 1, wherein the expandable base comprises a telescopic structure that can be extended and collapsed to vary the depth of the first compartment.

3. The sink organizer as in claim 2, wherein the container comprises at least a partition wall that defines the first compartment and a second compartment, wherein the second compartment has a second perforated bottom, and wherein the expandable base of the first compartment can be extended from a first position where the first bottom is closer to the second bottom, to a second position where the first bottom is farther from the second bottom.

4. The sink organizer as in claim 2, wherein the structure of the telescopic structure comprises an accordion-like structure.

5. The sink organizer as in claim 4, wherein the accordion-like structure comprises axially folding annular sections.

6. The sink organizer as in claim 5, wherein the expandable base is made of a flexible material.

7. The sink organizer as in claim 6, wherein the expandable base is made of rubber or silicone.

8. A sink organizer, comprising:
a container defined by walls;
at least a first compartment defined in the container, wherein the first compartment comprises an expandable base having a first perforated bottom, wherein the expandable base comprises a telescopic structure that can be extended and collapsed to vary the depth of the first compartment; and
suction cups provided on the container for mounting to a sink wall.

9. The sink organizer as in claim 1, further comprising a bracket mounted to the same support side wall on which the suction cups are provided, wherein the bracket has a handle that rests against top edge of the sink when the container is attached to the sink by the suction cups.

10. The sink organizer as in claim 9, wherein the handle is in the form of a bent wire frame.

11. The sink organizer as in claim 9, wherein the handle is at a height above the container side wall on which the suction cups are provided, and wherein the bracket is mounted to the support side wall in a manner allowing the height to be adjusted.

12. The sink organizer as in claim 11, wherein the handle is mounted to the container allowing the height to be adjusted at two or more indexed positions.

13. A sink organizer, comprising:
a container defined by walls;
suction cups provided on the container for mounting to a sink wall; and
a bracket coupled to the container wall, wherein the bracket has a handle that rests against top edge of a sink when the container is mounted to the sink.

14. The sink organizer as in claim 13, wherein the walls of the container comprises side walls including a support side wall, and wherein the suction cups are provided on the support side wall of the container to attach the support side wall of the container to a side wall of the sink, and the bracket is mounted to the same support side wall on which the suction cups are provided.

15. The sink organizer as in claim 14, wherein the handle is at a height above the container side wall on which the suction cups are provided, and wherein the bracket is mounted to the support side wall in a manner allowing the height to be adjusted.

16. The sink organizer as in claim 13, further comprising at least a first compartment defined in the container, wherein the first compartment comprises an expandable base having a first perforated bottom, wherein the expandable base is expandable in a direction to lower the first perforated bottom vertically into the sink with respect to the support side wall of the container.

17. A sink organizer, comprising:
   a container defined by side walls including a support side wall;
   an expandable base having a first perforated bottom, and wherein the expandable base is expandable in a direction to lower the first perforated bottom vertically into a sink with respect to the container side walls; and
   a bracket mounted to the support side wall of the container, wherein the bracket has a handle that rests against top edge of the sink when the container is mounted to a side wall of the sink, whereby the support side wall of the container lean against the side wall of the sink.

18. The sink organizer as in claim 17, wherein the handle is in the form of a bent wire frame.

19. The sink organizer as in claim 17, wherein the handle is at a height above the support side wall, and wherein the bracket is mounted to the support side wall in a manner allowing the height to be adjusted.

20. The sink organizer as in claim 19, wherein the handle is mounted to the support side wall allowing the height to be adjusted at two or more indexed positions.

21. The sink organizer as in claim 17, further comprising suction cups provided on the same support side wall of the container on which the bracket is mounted, to attach the support side wall of the container to the side wall of the sink.

* * * * *